Figure 1:
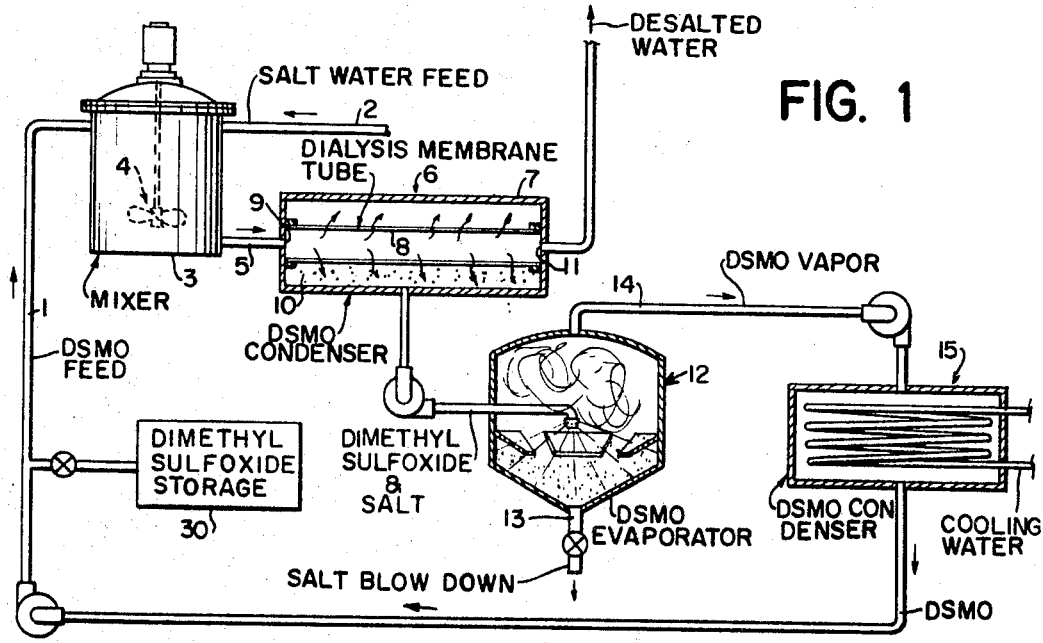

INVENTORS
THOMAS D. HAWKINS
MARTIN H. COOPER

INVENTORS
THOMAS D. HAWKINS
MARTIN H. COOPER

United States Patent Office 3,450,508
Patented June 17, 1969

3,450,508
EXTRACTION OF SALTS FROM SALINE WATER USING DIMETHYLSULFOXIDE
Martin H. Cooper, Chappaqua, and Thomas D. Hawkins, White Plains, N.Y., assignors to United Nuclear Corporation, a corporation of Delaware
Filed Sept. 1, 1966, Ser. No. 576,736
Int. Cl. B01j 9/00; B01d 11/00
U.S. Cl. 23—312         14 Claims This invention relates to extraction of the ionic salts from saline water. More specifically, this invention relates to an energy conserving process for the solvent extraction of the ionic salts from saline water that utilizes dimethylsulfoxide as a recycled solvent with a preferential affinity for ionic salts and a low energy of evaporation for the recovery of the solvent from the extracted salts. The term "saline water" herein includes natural brackish waters, sea water, and in general aqueous solutions containing a large variety of ionic salts for which dimethylsulfoxide has a preferential solubility. This process is also applicable to the extraction of valuable salts in aqueous solutions resulting from industrial processes, in particular the recovery of uranyl salts from solutions.

Considerable research effort has been directed to the development of an energy conserving and, hence, low cost saline water desalting process. A number of promising desalting processes have been developed that are thermal in nature, effecting desalinization either by distillation or by humidification. Other promising desalting processes employ electrodialysis, ion exchange resin columns, freezing techniques and reverse osmosis.

Organic solvent extraction processes have been developed that desalt saline water by selectively extracting pure water from the saline solution. Most of these pure water extraction processes employ a solvent, usually an amine or a mixture of amines, that has the characteristic of dissolving greater quantities of water at lower temperatures than at higher temperatures. In such processes, the cold organic solvent is used to extract the pure water from the saline solution and the extracted water is subsequently separated from the solvent by heating.

It is noteworthy that none of the solvent extraction desalting processes disclosed in the prior art extract the salts from the saline water; rather, the purified water itself is extracted from the saline water.

The present invention provides an energy conserving and hence economical process for desalting saline water that utilizes dimethylsulfoxide as a selective solvent which has a greater affinity than water for the ionic salts found in sea water and brackish waters. The present invention also finds utility in the purification of water from fresh water sources which have been contaminated by the intrusion of salts from industrial and mining operations.

Briefly stated, this invention is an energy conserving solvent extraction process for the extraction of the ionic salts from saline water which comprises (a) contacting the saline water with dimethylsulfoxide to produce a product raffinate of desalted water and an extract of dimethylsulfoxide enriched in salts extracted from the saline water, (b) separating the product raffinate from the extract which is in condition for evaporation at an energy level substantially lower than required to evaporate an equivalent quantity of water, (c) evaporating the dimethylsulfoxide at a low energy level to separate the dimethylsulfoxide from the extracted salts, thereby rendering the process energy conserving, and (d) condensing and recycling the evaporated dimethylsulfoxide.

The present invention is a saline water desalting process in which the energy consumption and hence the cost of producing fresh water are substantially reduced below that of conventional thermal desalting processes. The thermodynamic minimum energy required to extract salt ions from water is equal to the heat of solution of such salt ions. In the case of sodium chloride—the predominant ionic salt found in saline water—the heat of solution is 21.9 cal./gm. which is the equivalent of 0.767 cal./gm. of sea water. No process has been devised which will approach this thermodynamic minimum. In fact, this minimum energy requirement is rendered negligible in all known desalting processes when compared to the energy consumed by the means by which the separation of the ionic salts is effected.

In a simple distillation process, the means effecting separation of the salt ions is the evaporation of the water, such process requiring 619 cal./gm. of product water when computed on the basis of a saline water feed temperature of 20° C. (68° F.). Humidification processes effect evaporation at a temperature below the boiling point of the saline water. Consequently, a slight saving in energy consumption is effected, the theoretical energy consumption amounting to 607 cal./gm. of product water when computed on the basis of a saline water feed temperature of 20° C. (68° F.) and a mean air temperature of 160° F.

In the present invention the salt ions are preferentially dissolved in the dimethylsulfoxide. The dimethylsulfoxide is separated from the water by either dialysis through a membrance or adsorption on a suitable adsorbent. The dimethylsulfoxide is subsequently separated from the salt ions by evaporation and recycled. By this process, in essence, the heat of vaporization of dimethylsulfoxide is substituted for the heat of vaporization of water. Since the heat of vaporization of dimethylsulfoxide is 132 cal./gm. as compared to 539.6 cal./gm. for water, the improvement in economy of energy consumption of this process over simple distillation or humidification methods is considerable. Assuming that the process disclosed by this invention is utilized to desalt sea water (which has an ionic salt content of 35,000 parts per million) the energy consumption would amount to 84.9 cal./gm. of product water.

The novel energy conserving desalting process disclosed by this invention may be practiced by the utilization of known process steps common to many solvent extraction methods. A modified means of practicing this invention involves process steps similar to those of solvent extraction in which the extracting means is a solid granular adsorbent containing adsorbed dimethylsulfoxide. This modified method will be set forth in detail below in reference to FIG. 3 of the drawings.

In practicing this invention by liquid solvent extraction methods, the first step involves contacting the saline water feed and the dimethylsulfoxide solvent stream in a mixing zone. This first step may be accomplished by either a bubble plate mixer, an impinging jet mixer, an agitation vessel, a plate column, or a packed tower. Contacting the two components induces a mass transfer of the salt ions from the aqueous component into the dimethylsulfoxide to produce an aqueous raffinate depleted in salt ions and a dimethylsulfoxide extract enriched in salt ions. The mass transfer of the salt ions is caused by the greater affinity of the dimethylsulfoxide for the salt ions than the aqueous component. As a consequence of this difference in affinity, the fugacity or escaping potential of the salt ions is greater in the aqueous component than in the dimethylsulfoxide; hence, in dynamic equilibrium, the dimethylsulfoxide will contain a greater concentration of salt ions than the aqueous component.

After contacting the two components, the second step in the practice of this invention is to separate the raffinate and extract components produced in the mixing zone. For the purposes of this invention, separation of the raffinate and extract components may be effected with particular advantage by the use of a dialysis membrane which will preferentially pass the dimethylsulfoxide extract. A further particularly advantageous means of separation for this invention is the use of a solid granular adsorbent which will selectively adsorb the dimethylsulfoxide extract.

The third step of the process disclosed herein, is the evaporation of the separated extract stream to recover the dimethlsulfoxide solvent from the extracted salts. This step may be effected by any suitable evaporator device known in the art in which substantially all of the dimethylsulfoxide will be evaporated and in which only trace amounts of dimethylsulfoxide will be entrained in the salt recovered from the blow down of the evaporator.

The theoretical energy requirement of this process is consumed in this third step, the energy being consumed in the evaporation of the dimethylsulfoxide which has a heat of vaporization of 132 cal./gm. Assuming that this process is utilized to desalt sea water, the theoretical energy consumption in this step will amount to 84.9 cal./gm. of product water.

The final step of the process disclosed herein is the condensation and recovery of the evaporated dimethylsulfoxide which is then recycled to the mixing zone to be contacted with the saline water feed. This final step may be accomplished by any suitable condenser and it may be advantageously cooled by water from the saline water source.

As a further illustration of the present invention, reference may be made to the drawing which schematically represents three preferred embodiments of the present invention.

The schematic drawing in FIG. 1 represents one preferred process encompassed by this invention in which the raffinate and extract are separated by means of a dialysis membrane. The saline water feed 2 is mixed in an agitation tank 3 with the dimethylsulfoxide feed 1 from the dimethylsulfoxide storage 30 and from recycled dimethylsulfoxide from condenser 15. The mixing in agitation tank 3 is aided by propellor agitator 4. The mixed aqueous and dimethylsulfoxide components are transported through line 5 to a dialysis membrane separator 6. The separator is constructed of an outer shell 7 and an inner dialysis tube 8 whose wall is in part constructed from a dialysis membrane which will preferentially pass the dimethylsulfoxide extract phase. Suitable membranes for this purpose are goldbeater's skin (derived from oxen intestines) and various cellulose films. The mixed raffinate and extract component are introduced into the dialysis tube inlet at 9. The dimethylsulfoxide extract diffuses through the walls of the dialysis tube 8 into the outer compartment 10 between the outer shell and the dialysis tube. The aqueous raffinate continues to pass along the length of the dialysis tube and may be collected at the exit 11 as the product water or it may be sent to a second purification stage.

The dimethylsulfoxide extract is removed from the outer chamber of the dialysis membrane separation device and sent to an evaporator 12 which may be heated by any conventional means utilizing gas, steam or oil. The salt blow down from the bottom of the evaporator is collected from the evaporator at 13 and the evaporated dimethylsulfoxide leaves the evaporator at 14. The dimethylsulfoxide distillate is condensed in condenser 15, which may be cooled by water from the saline water source, and the distillate is then recycled to the mixing tank 3.

Figure 2:
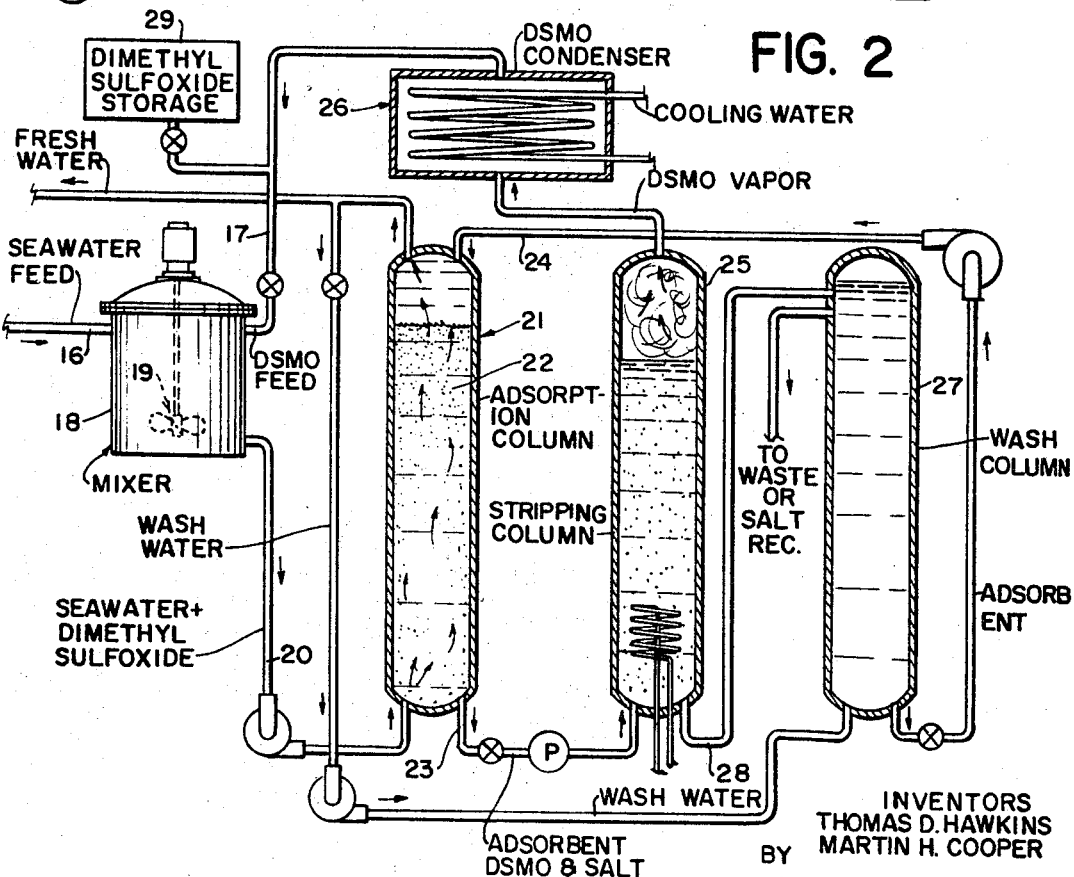

The schematic drawing in FIG. 2 represents a second preferred process encompassed by this invention in which the aqueous raffinate and the dimethylsulfoxide extract are separated by means of a solid granular adsorbent. The saline water feed 16 is mixed in an agitation tank 18 with the dimethylsulfoxide feed 17 from the dimethylsulfoxide storage 29 and from recycled dimethylsulfoxide from condenser 26. The mixing in agitation tank 18 is aided by propellor agitator 19. The two mixed components are withdrawn through line 20, and introduced at the bottom of an adsorption column 21, which is packed with an adsorbent 22 which will preferentially adsorb dimethylsulfoxide. Suitable granular adsorbents are charcoal, activated charcoal, aluminum oxide, silica gel, and zeolite salts. The adsorbent containing the adsorbed dimethylsulfoxide extract is continuously removed from the bottom of the column at 23, and is continuously replaced by fresh adsorbent at the top of the column at 24. The granular adsorbent removed from the adsorption column at 23 is conveyer to a stripping column 25 where the dimethylsulfoxide is evaporated. The evaporated dimethylsulfoxide from the evaporator is condensed in condenser 26, and recycled to the agitation tank 18. After the granular adsorbent is stripped, it is conveyed through line 28 to a washing column 27 where it is washed by part of the fresh product water. (Design estimates indicate that approximately 10% of the product water will be required to wash the adsorbent free of the salt residue.) After washing, the regenerated granular adsorbent is conveyed to the adsorption column for reuse.

Figure 3:
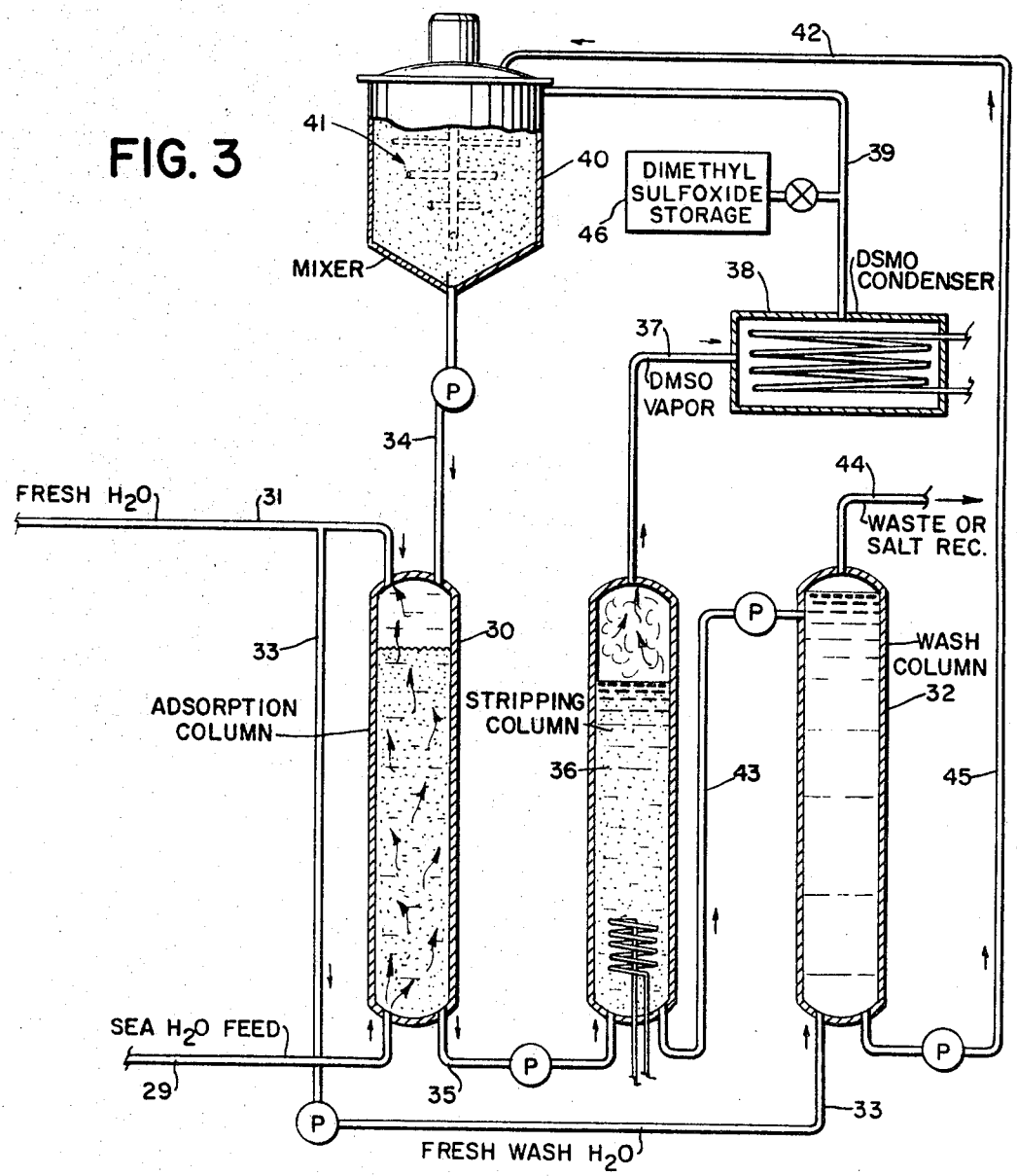

The schematic drawing in FIG. 3 represents a third preferred process encompassed by this invention in which the salt water feed is contacted with a solid granular adsorbent which has been saturated with dimethylsulfoxide. Suitable granular adsorbents for this process are charcoal, activated charcoal, aluminum oxide, silica gel and zeolite salts. The saline water feed 29 is introduced into the bottom of adsorption column 30 which contains the solid granular adsorbent which is saturated with dimethylsulfoxide. The fresh desalted product water is removed from the top of adsorption column 30 by means of line 31, a portion of which is sent to wash column 32 by means of line 33. The granular adsorbent saturated with dimethylsulfoxide and containing the extracted salts is continuously removed from the bottom of column 30 through line 35, and is continuously replaced by fresh saturated adsorbent at the top of column 30 through line 34. The saturated adsorbent removed from adsorption column 30 is conveyed through line 35 to stripping column 36 where the dimethylsulfoxide is evaporated, the evaporized dimethylsulfoxide being removed from the top of the stripping column through line 37. (The stripping column may be heated by any conventional means using gas, steam or oil.) The evaporated dimethylsulfoxide from the stripping column is condensed in condenser 38, and recycled to mixer 40, along with make-up from dimethylsulfoxide storage, 46. In mixer 40 the dimethylsulfoxide is mixed by means of mechanical beaters 41 with fresh solid adsorbent from line 42. (Advantageously, the condenser may be cooled by water from the saline water source.) After the granular adsorbent is stripped of dimethylsulfoxide, it is conveyed through line 43 to the top of wash column 32 where it is washed by part of the fresh water product introduced into the bottom of the wash column by means of line 33, the wash water containing the dissolved salt being withdrawn from the top of the wash column through line 44. After washing, the regenerated granular adsorbent is removed from the bottom of wash column 32 and conveyed through line 45 to mixer 40 for recombination with the dimethylsulfoxide.

As a consequence of the low energy consumption of the desalting processes disclosed by the present invention, fresh water may be produced from saline water at a cost practical for many large scale applications. Table I below summarizes theoretical estimates of the cost of producing fresh water from various saline waters utilizing the preferred method described above in reference to FIG. 3. The estimates were based on a plant with a capacity of ten million gallons a day operating at 80% capacity. For purposes of the estimates, it was assumed that an activated granular charcoal was utilized as an adsorbent to separate the dimethylsulfoxide extract from the aqueous raffinate. It was further assumed that no more than 5 parts per million dimethylsulfoxide would be lost to the product water or entrained in the salt residue. A 10% recycle of the product water to wash the salt from the adsorbent was also assumed.

TABLE I

| Total dissolved solids, parts per million: | Production cost of water, dollars per 1,000 gallons |
|---|---|
| 35,000 [1] | 0.423 |
| 20,000 | 0.331 |
| 10,000 [2] | 0.261 |
| 5,000 | 0.222 |

[1] Average sea water concentration.
[2] Typical brackish water concentration.

These production costs compare favorably with the costs of water for various fresh water systems in the United States, representative cost figures appearing in Table II.

TABLE II

| | Cost, dollars per 1,000 gallons |
|---|---|
| U.S.A. average costs | 0.12–0.15 |
| U.S.A. acceptable cost for small industrial and municipal supplies | 0.50–0.70 |
| Southwest U.S.A. estimated cost for a current project | 1.30 |

The estimated cost of fresh water produced by the present invention compares favorably with the estimated production costs for numerous large scale remote water catching systems under consideration for Paris, Manchester, California, and Dakar. The design studies for these projects estimate that the cost of fresh water will be in the range of 30¢ to 65¢ per 1,000 gallons.

The following examples are illustrative of the effectiveness of various process steps in the three preferred embodiments of the present invention described above. The examples below, however, are not to be considered as limiting the scope of this invention.

Example I

This example is illustrative of the facility with which salts may be extracted from saline water by the use of dimethylsulfoxide as a selective solvent. This example is also illustrative of the separation of the dimethyl sulfoxide extract component from the aqueous raffinate component through the use of a dialysis membrane.

A saline solution was prepared consisting of 4 grams sodium chloride per 100 ml. of distilled water. 25 ml. of dimethylsulfoxide were mixed together by agitation for 3 minutes and the solution was filtered through a 5" x 5" x 0.003" thick dialysis membrane of goldbeater's skin.

Approximately 23 ml. of the solution was filtered through the membrane in a period of about 5 minutes after which the filtration ceased. The unfiltered effluent was then treated with a second 25 ml. portion of dimethylsulfoxide and filtered in the same manner. The effluent of the second extraction was treated with a third 25 ml. portion of dimethylsulfoxide and again filtered. The data for the three succesive extractions are summarized in Table III below:

TABLE III

| | Volume of filterate, (ml.) | Initial salt, mols | Salt removed, mols | Percent salt removed |
|---|---|---|---|---|
| Extraction 1 | 23.0 | 0.0174 | 0.0073 | 42.8 |
| Extraction 2 | 24.5 | 0.0101 | 0.00498 | 48.3 |
| Extraction 3 | 22.0 | 0.0051 | 0.0025 | 49.0 |
| Results for three extractions | | 0.0174 | 0.0148 | 85.5 |

Example II

This example is a further illustration of the utilization of dimethylsulfoxide as a selective solvent for the extraction of salts from saline water and of the utilization of a dialysis membrane for the separation of the raffinate and extract components produced in the salt extraction.

A saline solution was prepared consisting of 4 grams sodium chloride per 100 ml. of distilled water. 25 ml. of the saline solution was added to 100 ml. of dimethyl sulfoxide, and the mixture was filtered at a temperature of 27° C. The results of the filtration are summarized in Table IV below:

TABLE IV

| | |
|---|---|
| Volume effluent, ml. | 104 |
| Salt removed, mols | 0.0145 |
| Percent removed | 83.6 |

Example III

This example is illustrative of the affinity of activated granular charcoal adsorbents for dimethylsulfoxide.

Five tests were conducted in which the adsorption capacity of activated granulated charcoal for dimethylsulfoxide was measured for various temperatures and particle mesh size. The results are summarized in Table V below:

TABLE V

| Mesh size | Temp., ° C. | Dimethylsulfoxide adsorption (gm. dimethylsulfoxide, gm. charcoal) |
|---|---|---|
| 80 | 23 | 2.4 |
| 80 | 60 | 2.2 |
| 80 | 90 | 2.0 |
| 8–14 (mixture of sizes) | 5 | 0.8 |
| 8–14 (mixture of sizes) | 22 | 0.94 |

Example IV

This example is illustrative of the facility with which salts may be extracted from saline water by use of dimethylsulfoxide as a selective solvent. This example is also illustrative of the separation of the dimethylsulfoxide extract from the aqueous raffinate through the use of a solid granular adsorbent.

Four tests were conducted at various temperatures and charcoal mesh size in which 100 ml. of 4% NaCl solution and 100 ml. of dimethylsulfoxide were mixed by agitation for 3 minutes. 100 gm. of activated granular charcoal were added to this mixture and the mixture was again agitated for 3 minutes. The mixture was then filtered through standard filter paper, and the effluent charcoal was assayed for salt and dimethylsulfoxide content.

In each case, no trace of dimethylsulfoxide in the aqueous filtrate was detected by sight, touch, or smell.

The results of the four tests are summarized below:

TABLE VI

| Charcoal mesh size | Temp., ° C. | Measured capacity gms. NaCl removed, 100 cc. DMSO | Percent water Adsorption on charcoal |
|---|---|---|---|
| 80 | 5 | 2.5 | 12.0 |
| 80 | 20 | 3.6 | 20.0 |
| 80 | 60 | 2.6 | 42.1 |
| 80 | 90 | 3.3 | 76.0 |

Example V

This example is illustrative of the facility with which salts may be extracted from saline water by contacting the saline water with a solid granular adsorbent saturated with dimethylsulfoxide.

Two tests were conducted at various temperatures and mesh sizes in which 100 ml. of 4% NaCl solution and granular charcoal saturated with 100 ml. of dimethylsulfoxide were mixed with agitation for 3 minutes. The mixture was then filtered through standard filter paper, and the effluent charcoal was assayed for salt and water content.

In each case, no trace of dimethylsulfoxide in the aqueous filtrate was detected by sight, touch, or smell.

The results of the two tests are summarized below:

TABLE VII

| Charcoal mesh size | Temp., °C. | Measured capacity gms. NaCl removed, 100 cc. DMSO | Percent water adsorption on charcoal |
|---|---|---|---|
| 8-14 [1] | 8 | 5.6 | 16.0 |
| 8-14 [1] | 29 | 6.0 | 28.0 |

[1] Mixture of mesh sizes.

The above description and particularly the examples set forth are by way of illustration only. It will be obvious to one skilled in the art that many variations and modifications can be made without departing from the spirit and scope of the invention herein described.

We claim:

1. An energy conserving process for the extraction of sodium chloride and other ionic salts present therewith from saline water containing sodium chloride which comprises:
   (a) contacting a desired amount of saline water with a predetermined amount of dimethyl sulfoxide for a sufficient period of time to extract a desired amount of the sodium chloride and other ionic salts from said saline water to produce an aqueous raffinate havign a lower sodium chloride and other ionic salts concentration than the starting concentration and a dimethylsulfoxide extract having the extracted sodium chloride and other ionic salts therein,
   (b) separating the dimethylsulfoxide extract from the aqueous raffinate, the dimethylsulfoxide extract being in condition for evaporation at an energy level substantially lower than that required to evaporate said desired amount of saline water,
   (c) evaporating the dimethylsulfoxide at a low energy level to separate the dimethylsulfoxide from the extracted sodium chloride and other ionic salts, thereby rendering the process energy conserving, and
   (d) condensing and collecting the evaporated dimethylsulfoxide.

2. A process according to claim 1 in which the aqueous raffinate and the dimethylsufoxide extract are separated by introducing the two components into a first compartment of a cell having a first and a second compartment separated by a membrane which is preferentially permeable to the dimethylsulfoxide extract so that said extract will pass through the membrane into the second compartment and thereby become separated from the aqueous raffinate.

3. A process according to claim 2 in which the dialysis membrane consists of goldbeater's skin.

4. A process according to claim 1 in which:
   (a) the dimethylsulfoxide extract is separated from the aqueous raffinate by contacting the two components with a solid granular adsorbent that will adsorb the dimethylsulfoxide in preference to the aqueous component, and
   (b) removing the dimethylsulfoxide from the solid granular adsorbent containing the adsorbed dimethylsulfoxide by heating the absorbent to evaporate the dimethylsulfoxide.

5. A process according to claim 4 in which the solid granular adsorbent is selected from the group consisting of charcoal, activated charcoal, aluminum oxide, silica gel, and zeolite salts.

6. An energy conserving process for the extraction of sodium chloride and other ionic salts present therewith from saline water containing sodium chloride comprising:
   (a) contacting a desired amount of saline water containing sodium chloride and other ionic salts present therewith with predetermined amount of a solid granular adsorbent containing a sufficient amount of adsorbed dimethylsulfoxide to extract a desired amount of the sodium chloride and other ionic salts, said saline water being contacted with said adsorbent for a sufficient period of time to extract said desired amount of the sodium chloride and other ionic salts, from said saline water into the adsorbed dimethyl sulfoxide,
   (b) separating the solid granular adsorbent containing the adsorbed dimethylsulfoxide and the extracted sodium chloride and other ionic salts from the aqueous raffinate, the adsorbed dimethylsulfoxide containing the extracted sodium chloride and other ionic salts being in condition for evaporation from the adsorbent at an energy level substantially lower than that required to evaporate said desired amount of saline water,
   (c) heating the separated adsorbent containing the adsorbed dimethylsulfoxide to evaporate at a low energy level the dimethylsulfoxide from the extract salts and the solid adsorbent, and
   (d) condensing and collecting the evaporated dimethylsulfoxide.

7. A process according to claim 6 in which the solid granular adsorbent is selected from the group consisting of charcoal, activated charcoal, aluminum oxide, silica gel and zeolite salts.

8. An energy conserving continuous process for the extraction of sodium chloride and ionic salts present therewith from sodium chloride containing saline water which comprises:
   (a) contacting continuously in a first zone a desired amount of saline water with a predetermined amount of dimethylsulfoxide for a sufficient period of time to extract a desired amount of said sodium chloride and other ionic salts from said saline water to produce an aqueous raffinate having a lower sodium chloride and ionic salts concentration than the starting concentration and a dimethylsulfoxide extract having the extracted sodium chloride and ionic salts therein,
   (b) directing the resultant mixture of the raffinate and extract to a second zone,
   (c) separating in said second zone the aqueous raffinate from the dimethylsulfoxide extract which is in condition for evaporation at an energy level substantially lower than required to evaporate said desired amount of saline water,
   (d) evaporating in a third zone the dimethylsulfoxide recovered from the second zone to separate the dimethylsulfoxide from the extracted sodium chloride and ionic salts, the dimethylsulfoxide evaporating at a low energy level thereby rendering the process energy conserving,
   (e) condensing and collecting in a fourth zone the evaporated dimethylsulfoxide recovered from the third zone, and
   (f) recycling the collected dimethyl sulfoxide to the first zone.

9. A continuous process according to claim 8 in which the aqueous raffinate and the dimethylsulfoxide extract are separated in the second zone by continuously introducing the two components into a first compartment of a cell having a first and second compartment separated by a membrane which is preferentially permeable to the dimethylsulfoxide extract so that said extract will continuously pass through the membrane into the second compartment from which it is continuously withdrawn, the aqueous raffinate being continuously withdrawn from the first compartment.

10. A continuous process according to claim 9 in which the dialysis membrane consists of goldbeater's skin.

11. A process according to claim 1 in which:
   (a) the dimethylsulfoxide extract is separated from the aqueous raffinate in the second zone by continuously contacting the two components with a solid granular adsorbent that will adsorb the dimethyl sulfoxide extract in preference to the aqueous component,
   (b) continuously separating the solid granular adsorbent containing the adsorbed dimethylsulfoxide extract from the aqueous component and continuously directing said solid granular adsorbent to a third zone, and (c) heating in said third zone said solid granular adsorbent to evaporate the dimethylsulfoxide.

12. A continuous process according to claim 11 in which the solid granular adsorbent is selected from the group consisting of charcoal, activated charcoal, aluminum oxide, silica gel and zeolite salts.

13. An energy conserving continuous process for the extraction of sodium chloride and ionic salts present therewith from sodium chloride containing saline water which comprises:

(a) continuously contacting in a first zone a desired amount of saline water with a predetermined amount of solid granular adsorbent containing a sufficient amount of adsorbed dimethylsulfoxide to extract a desired amount of said sodium chloride and ionic salts from said saline water, said saline water being contacted with said adsorbent for a sufficient period of time to extract said desired amount of sodium chloride and ionic salts from said saline water into the adsorbed dimethylsulfoxide to produce an aqueous raffinate having a lower sodium chloride and ionic salts concentration than the starting concentration, (b) withdrawing continuously the aqueous raffinate from said first zone and directing the solid granular adsorbent containing the adsorbed dimethylsulfoxide and the extracted sodium chloride and ionic salts from said first zone to a second zone, the adsorbed dimethyl sulfoxide being in condition for evaporation at an energy level substantially lower than that required to evaporate said desired amount of saline water, (c) heating to evaporate in said second zone the dimethylsulfoxide adsorbed on the granular adsorbent recovered from the first zone to separate the dimethyl sulfoxide from the solid granular adsorbent and the extracted salts, the dimethylsulfoxide evaporating at a low energy level, thereby rendering the process energy conserving, (d) condensing and collecting in a third zone the dimethylsulfoxide recovered from said second zone, (e) withdrawing the solid granular adsorbent containing the extracted salts from said second zone and directing it to a fourth zone, (f) washing in said fourth zone the solid granular adsorbent with a portion of the aqueous raffinate recovered from the first zone to separate the extracted salt from the solid granular adsorbent, (g) withdrawing the washed solid granular adsorbent from said fourth zone and directing it to a fifth zone in which the solid granular adsorbent is mixed with a sufficient amount of dimethylsulfoxide recovered from the third zone, the dimethylsulfoxide adsorbing into the solid granular adsorbent, and (h) recycling the solid granular adsorbent containing the adsorbed dimethylsulfoxide from said fifth zone to the first zone.

14. A process according to claim 13 in which the solid granular adsorbent is selected from the group consisting of charcoal, activated charcoal, aluminum oxide, silica gel and zeolite salts.

References Cited

UNITED STATES PATENTS

| | | | |
|---|---|---|---|
| 3,197,274 | 7/1965 | White | 23—312 X |
| 3,316,172 | 4/1967 | Hess | 210—59 |
| 3,358,036 | 12/1967 | Morenberg | 260—607 |
| 3,376,203 | 4/1968 | Lackey | 260—607 X |
| 3,389,078 | 6/1968 | Elzinga | 210—21 X |

FOREIGN PATENTS 1,428,958  3/1965  France.

OTHER REFERENCES

Parker: Quarterly Rev., vol. 15–16, 1961–1962, pp. 163 to 187.

"Crown" Zellerback Corporation, Bulletin, Dimethylsulfoxide Recovery From Aqueous Solution, 1967, pp. 1 to 10.

Kenttamaa: Soumen Kemisti Ichti, vol. 33, 1960, pp. 179 to 182.

Fischbeck: First Symposium on Water Desal., S.W.D.–104, October 1965, pp. 1–3.

NORMAN YUDKOFF, *Primary Examiner.*

S. J. EMERY, *Assistant Examiner.*

U.S. Cl. X.R.

23—89, 312; 210—21, 321; 260—607